cx="0.67"/>
(12) United States Patent
Garg et al.

(10) Patent No.: US 12,456,014 B2
(45) Date of Patent: Oct. 28, 2025

(54) INTELLIGENT KEYWORD RECOMMENDER

(71) Applicant: SAP SE, Walldorf (DE)

(72) Inventors: Neha Garg, Bangalore (IN); Sudhir Verma, Gurgaon (IN); Shilpa Viswanadha, Gurgaon (IN); Ayushi Singla, Jagadhri (IN); Sven Herzberg, Sandhausen (DE)

(73) Assignee: SAP SE, Walldorf (DE)

( * ) Notice: Subject to any disclaimer, the term of this patent is extended or adjusted under 35 U.S.C. 154(b) by 524 days.

(21) Appl. No.: 17/380,934

(22) Filed: Jul. 20, 2021

(65) Prior Publication Data
US 2023/0024135 A1  Jan. 26, 2023

(51) Int. Cl.
*G06F 40/00* (2020.01)
*G06F 9/50* (2006.01)
(Continued)

(52) U.S. Cl.
CPC .......... *G06F 40/289* (2020.01); *G06F 9/5077* (2013.01); *G06F 16/313* (2019.01);
(Continued)

(58) Field of Classification Search
CPC .... G06F 40/289; G06F 9/5077; G06F 16/313; G06F 16/35; G06F 18/214; G06F 2209/505; G06F 16/3322
See application file for complete search history.

(56) References Cited

U.S. PATENT DOCUMENTS

2014/0288920 A1* 9/2014 Proux ............. G10L 15/00
704/9
2020/0293946 A1  9/2020 Sachan et al.
(Continued)

FOREIGN PATENT DOCUMENTS

| CN | 103562916 B | 3/2017 |
| CN | 107193883 B | 6/2020 |
| KR | 20200121391 A | 10/2020 |

OTHER PUBLICATIONS

Extended European Search Report issued in European Application No. 22185599.2-1203, mailed Nov. 16, 2022, 24 pages.
(Continued)

*Primary Examiner* — Edgar X Guerra-Erazo
(74) *Attorney, Agent, or Firm* — Mintz Levin Cohn Ferris Glovsky and Popeo, P.C.

(57) ABSTRACT

Systems, methods, and computer program products are provided for generation of keywords for a solution note for resolving an issue associated with a computing component. A dataset for training a keyword data model is received. The dataset includes a plurality of variables associated with one or more values. The keyword data model is configured for determination, as a function of one or more variables in the plurality of variables, of one or more keywords in a plurality of keywords associated with a computing solution in a plurality of computing solutions for resolving a problem with an operation of a computing component in a plurality of computing components. The keyword data model is trained using the received dataset and the keyword data model is applied to one or more variables in the received dataset to generate one or more keywords. One or more keywords associated with the computing solution is generated.

18 Claims, 8 Drawing Sheets

(51) Int. Cl.
G06F 16/31 (2019.01)
G06F 16/35 (2019.01)
G06F 18/214 (2023.01)
G06F 40/289 (2020.01)

(52) U.S. Cl.
CPC ............ *G06F 16/35* (2019.01); *G06F 18/214* (2023.01); *G06F 2209/505* (2013.01)

(56) References Cited

U.S. PATENT DOCUMENTS

2020/0328961 A1* 10/2020 Puri .................. H04L 43/16
2021/0385123 A1* 12/2021 Friedrichs ........... H04L 41/0631
2021/0406685 A1* 12/2021 Carmody ................. G06N 3/04
2022/0083879 A1* 3/2022 Jo ........................... G06N 5/04

OTHER PUBLICATIONS

Xin Wan et al., "Applying Keyword Map Based Learner Profile to a Recommender System for Group Learning Support," IEEE paper dated Mar. 6, 2010.

Top AI-Powered Search and Recommendation Technologies | SaM Solutions https://www.sam-solutions.com/blog/ai-powered-search-and-recommendation-technologies/.

Zeshan Fayyaz, et al., "Recommendation Systems: Algorithms, Challenges, Metrics, and Business Opportunities," Appl. Sci. 2020, 10(21), 7748.

* cited by examiner

INTELLIGENT KEYWORD RECOMMENDER

TECHNICAL FIELD

This disclosure relates generally to data processing and, in particular, to generation and recommendation of various keywords for resolution of issues with computing systems, applications, etc.

BACKGROUND

In today's world, many companies rely on software applications to conduct their business. Software applications deal with various aspects of companies' businesses, which can include finances, product development, human resources, customer service, management, and many other aspects. Software applications typically operate from servers and can be stored in memory. Many computing systems, software applications, etc. periodically encounter various issues that may require resolution in order to function properly. In order to quickly resume their operation, it is important to locate correct solutions that address problems associated with such computing systems, software applications, etc.

SUMMARY

In some implementations, the current subject matter relates to a computer implemented method for generation and recommendation of various keywords for resolution of issues with computing systems, applications, etc. The method may include receiving, by at least one processor, a dataset for training a keyword data model. The dataset may include a plurality of variables associated with one or more values. The keyword data model may be configured for determination, as a function of one or more variables in the plurality of variables, of one or more keywords in a plurality of keywords associated with a computing solution in a plurality of computing solutions for resolving a problem with an operation of a computing component in a plurality of computing components. The method may also include training the keyword data model using the received dataset, applying the keyword data model to one or more variables in the received dataset to generate one or more keywords, and generating one or more keywords associated with the computing solution.

In some implementations, the current subject matter may include one or more of the following optional features. For example, the plurality of variables may include at least one of the following: variables identifying one or more computing components in the plurality of computing components, variables identifying one or more computing solutions in the plurality of computing solutions, variables identifying at least one keyword in the plurality of keywords, variables identifying one or more indications indicating applicability of the computing solution to resolving the problem, and any combination thereof. The generation of keywords may include ranking the one or more generated keywords using the variables in the plurality of variables. Further, the values associated with the variables may include one or more historical values (e.g., previously used keywords, previously used solution notes, etc.).

In some implementations, generation of keywords may include associating the generated keywords with the computing solution in the plurality of computing solutions prior to using the computing solution to resolving the problem. Alternatively, or in addition to generation of keywords may include associating the generated keywords with the computing solution after using the computing solution to resolving the problem.

In some implementations, the method may also include updating the generated keywords by repeating at least one of the receiving, the training, the applying and the generating using an updated dataset. At least one of the receiving, the training, the applying and the generating may be performed using one or more computing containers being executed in a clustered computing environment.

In some implementations, the method may include generating one or more views for at least one of performing at least one of the receiving, the training, the applying and the generating, and displaying the generated keywords. The method may also include searching, using the generated keywords, for the computing solution for resolving the problem with the operation of the computing component in the plurality of computing components. The search may be executed using one or more views.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address the deficiencies of currently available solutions, one or more implementations of the current subject matter provide for an ability to provide for generation and recommendation of various keywords associated with solutions to resolve issues with computing systems, applications, etc.

Figure 1:
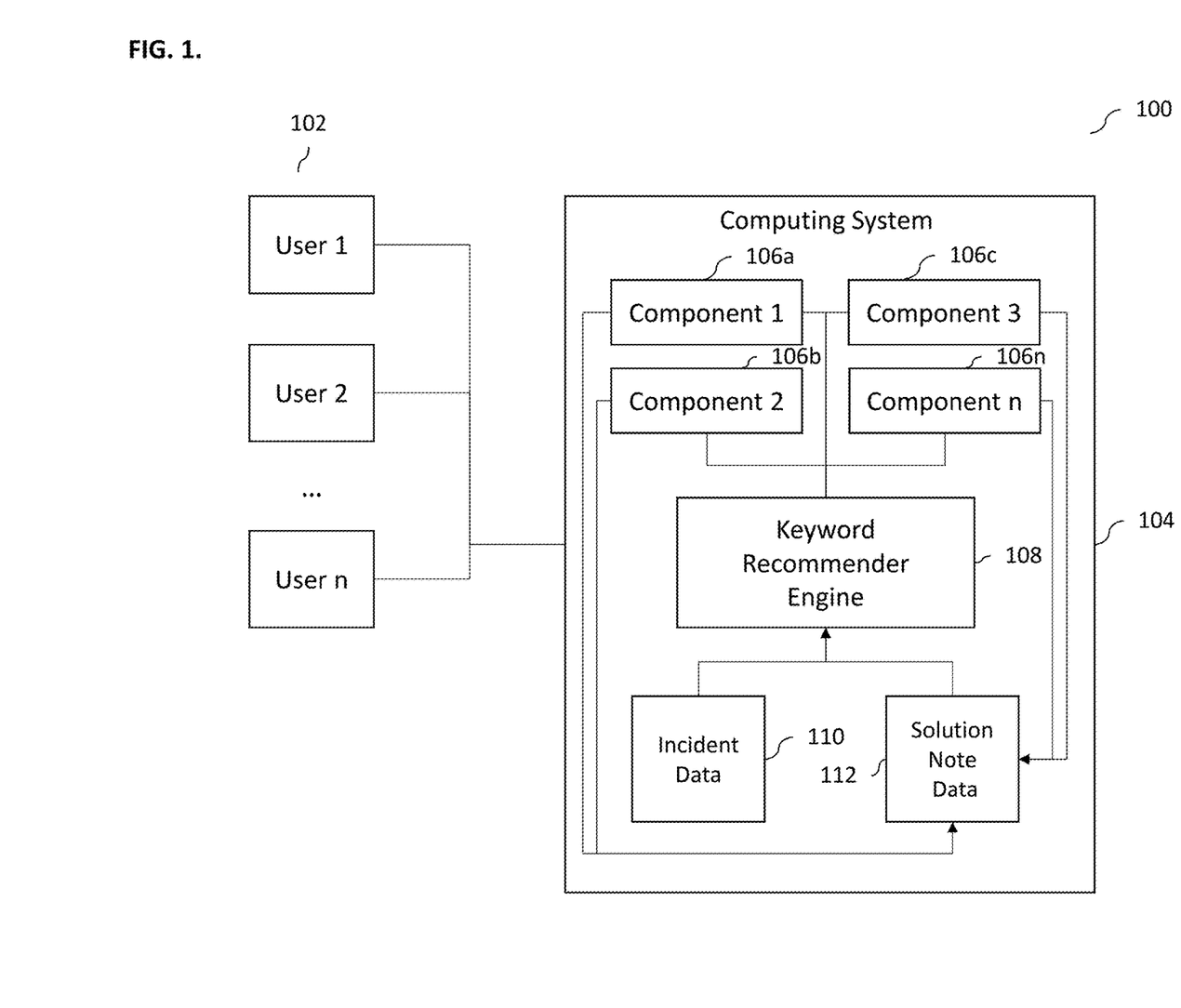
FIG. 1 illustrates an exemplary system for generating and/or recommending keywords associated with solutions to issues associated with computing systems, software applications, etc., according to some implementations of the current subject matter.

FIG. 1 illustrates an exemplary system 100 for generating and/or recommending keywords for location, identification, etc. of solutions to issues associated with computing systems, software applications, etc., according to some implementations of the current subject matter. The system 100 may be configured to operate in one or more clustered computing environments (e.g., Kubernetes). It may include one or more users, entities, applications, pods, etc. 102 (e.g., user 1, user 2, . . . , user n, etc.), and a computing system 104 that may include one or more computing components (e.g., component 1, component 2, component 3, . . . , component n) 106 (a, b, c, . . . ).

The computing system 104 may be configured to include a keyword recommender component 108 that may receive data from the incident data component 110 and/or solution note data component 112. The keyword recommender component 108 may include a processor, a memory, and/or any combination of hardware/software, and may be configured to generate and/or recommend one or more keywords that may be used to locate a particular solution to problem that a user 102 may experience with one or more components 106. The recommender component 108 may include one or more artificial intelligence and/or learning capabilities that may rely and/or use incident data, e.g., data related to and/or identifying a specific problem that the user 102 experienced/ encountered with one or more components 106. The component 108 may also be configured to use solution note data, e.g., data that related to and/or describing a solution to a particular problem with one or more components 106 that has been resolved in the past. The component 108 may be configured to combine one or more of the incident data and/or solution note data to generate one or more keywords that may be used to identify and/or locate a solution to a problem/issue that the user experienced with the component (s) 106 (e.g., a current problem/issue and/or any future problem/issue).

Components of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

The components of the system 100 may include any combination of hardware and/or software. In some implementations, the components may be disposed on one or more computing devices, such as, server(s), database(s), personal computer(s), laptop(s), cellular telephone(s), smartphone(s), tablet computer(s), and/or any other computing devices and/or any combination thereof. In some implementations, the components may be disposed on a single computing device and/or can be part of a single communications network. Alternatively, the components may be separately located from one another.

In some implementations, the keyword recommender engine 108 may be configured to use data from the incident data component 110 and/or solution note data component 112 to generate one or more keywords, one or more keyword and/or catch phrases, and/or any other data (hereinafter, "keywords") that may be used for searching of solutions to specific problems that may be encountered in connection with execution of one or more components 106. The generated keywords may be displayed in a user interface dashboard (not shown in FIG. 1) and presented to the user. The engine 108 may be configured to generate keywords automatically (e.g., using data from components 110, 112) and/or asynchronously. The engine 106 may be configured to use any data related to any incident (e.g., current, past, and/or future) associated with a particular component. The data may include any historical data of incident, solutions data, etc. The data may be used as input to machine learning processes/algorithms, which may be configured to extract relevant information related to the incident and generate keywords. The keywords may be ranked using various parameters, e.g., frequency of incidents, frequency of searches, frequency of component use, etc., where the highest ranked keyword may be selected as most relevant keyword that may be used for searching for a solution to a particular problem encountered by the user 102 with one or more components 106.

The engine 108 may be configured to generate and/or recommend relevant keywords in one or more of the following instances: pre-integration (e.g., prior to solution to a specific issue with one or more components 106 becoming operational and/or available to users 102 for use) of one or more components into the system 104 and/or post-integration (e.g., subsequent to the solution to that issue becoming operational and/or available to users 102 for use). In the pre-integration instance, the engine 108 may be configured to receive various data (e.g., incident data, other solutions data, etc.) that may be associated with and/or related to the solution to the issue and generate one or more keywords. The keywords may be provided to one or more developers during development of the solution to that issue (e.g., development of a solution note).

In the post-integration instance, the engine 108 may be configured to suggest one or more keywords (e.g., missing keywords, additional keywords, etc.) for any solution note which was already created and being recommended for solution to various issues in one or more incidents that may or may not be related to the same and/or different component 106. In the post-integration instance, the engine 108 may be configured to receive user sentiment data as well as an input. The engine 108 may be configured to use machine learning processes to determine that a particular solution note is not being used in a correct way (e.g., for a specific issues associated with a specific component 106) and/or may be being used with an incorrect component and/or issue.

In some implementations, a user interface may be configured to be generated by the system 104 to display the generated/recommended keywords to a user (e.g., developer, solution administrator, etc., and/or user 102). Once the user determines that the generated/recommended keywords can be used to search for a solution to a particular issue with one or more components 106, the user may transmit an indication to the engine 108 that the generated/recommended keywords should be used in connection with a specific solution note addressing a specific issue with one or more components 106. An application programming interface (API) may be used for transmission of the user's indication to the engine 108.

In some implementations, the engine 108 may be configured to update the previously generated/recommended keywords associated with a particular solution (such as during a post-integration instance). Such update may occur automatically, whereby, for example, the engine 108 may be configured to receive updated incident and/or solution note data from components 110, 112 and/or user(s) 102, and generate updated keywords. Alternatively, or in addition to, the update to the keywords may be transmitted to the engine 108, for example, by one or more users 102, and the engine 108 may be requested to execute such update.

Figure 2:
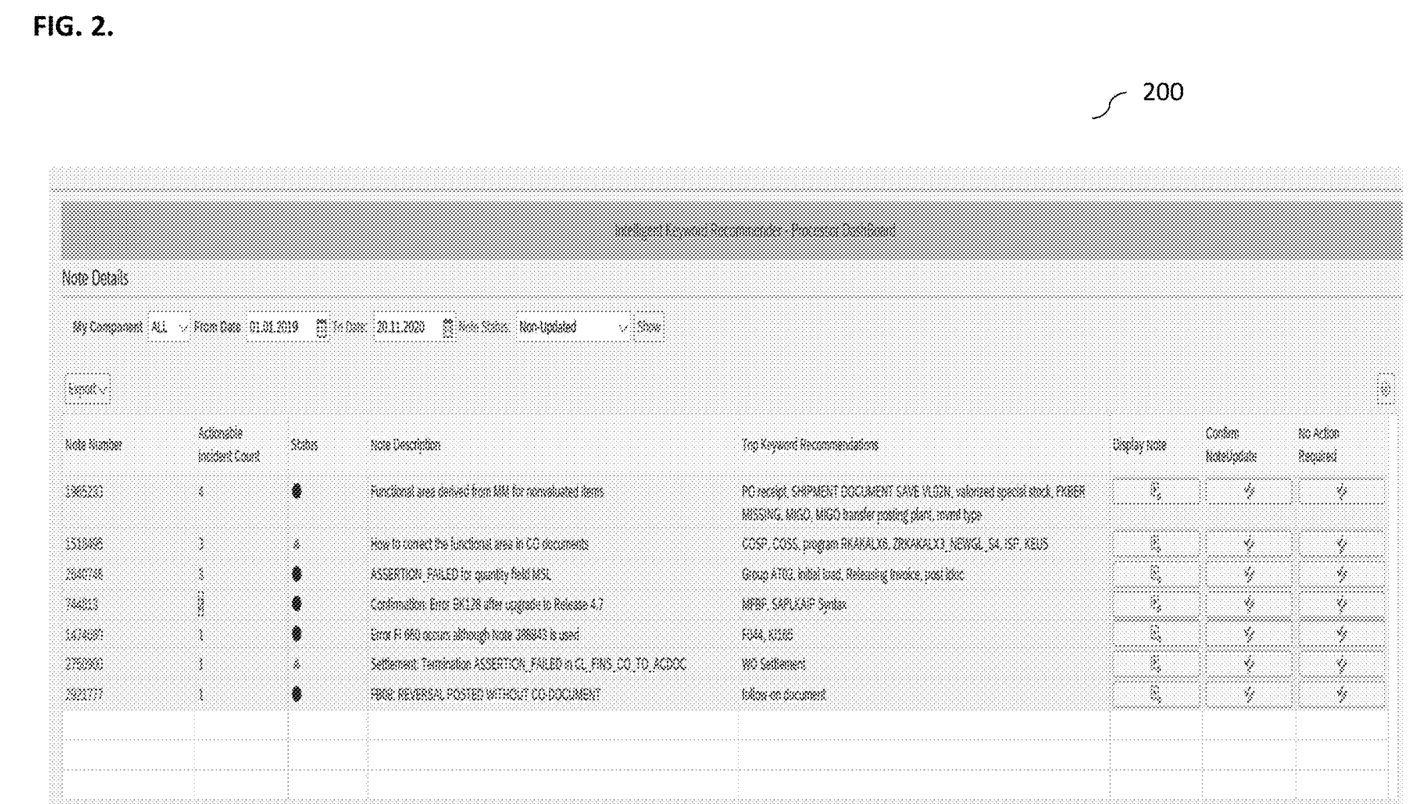
FIG. 2 illustrates an exemplary processor view, according to some implementations of the current subject matter.
Figure 3:
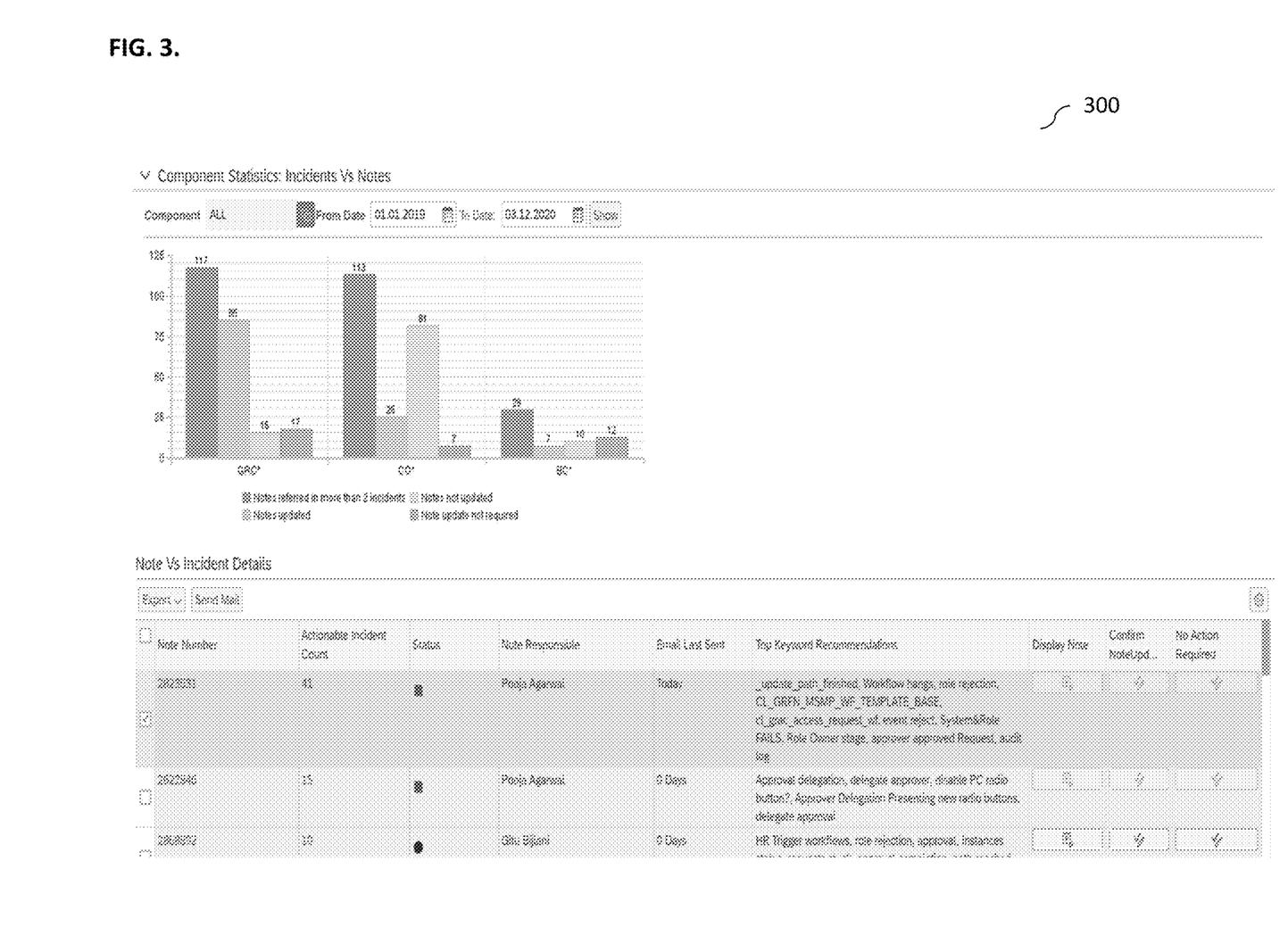
FIG. 3 illustrates an exemplary component owner view, according to some implementations of the current subject matter.

The system 104 may be configured to generate one or more of the following application views that may be used for generation and/or viewing of the keywords (by way of a non-limiting example, the views may be generated using Javascript libraries, e.g., React.JS, Node.JS, etc.). The views may include a processor view (as shown in FIG. 2) and a component owner view (as shown in FIG. 3). The processor view 200, as shown in FIG. 2, may be generated by the system 104 (shown in FIG. 1) and may be configured to display one or more solution notes ("Note Description") for a particular incident. Each solution note may be associated with a particular incident count (e.g., the number of times a particular incident has occurred). The view may be ranked or sorted using the count values.

The processor view 200 may include a listing of keywords (e.g., "Top Keyword Recommendations" column shown in FIG. 2) for each solution note. The view 200 may also include a listing of any actions that may need to be performed, e.g., keyword modification, new key word addition, keyword update, keyword deletion, etc. The view 200 may also include status of each particular solution note, keyword, action item, etc.

The component owner view 300 may be generated by one or more components 106 (as shown in FIG. 1) and may be used by component owners (e.g., developers of components 106, users of components 106, quality expert users of components, component user owners, manager users, auditor users, and/or any other authorized users) to view details of solution notes, generated/recommended keywords, solution notes which may require keyword modification at component level, etc. for one or more components 106. For example, as shown in FIG. 3, the component owner view may include one or more bar graphs for each component that may indicate a total of solution notes that may require modifications, solution notes that are being updated, solution notes that may still need updates, and/or solution notes that do not require any modifications. Each bar graph may be used to display details of corresponding solution notes and/or any required actions that can be taken. In some implementations, using the component owner view 300, the component owners may generate appropriate actions for updating keywords for a specific solution note. The actions may be generated automatically, manually, etc.

Figure 4:
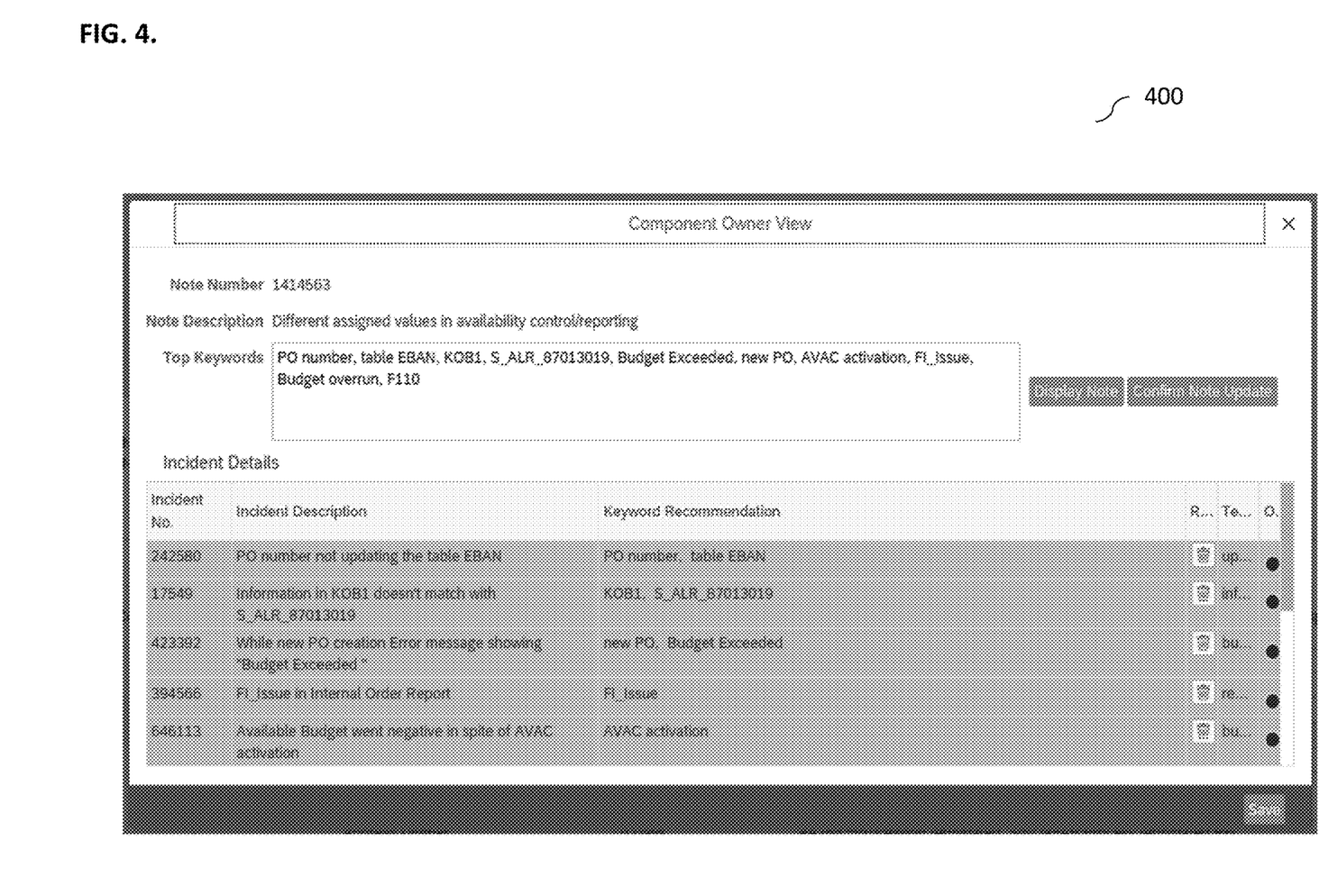
FIG. 4 illustrates an exemplary user interface displaying various generated keywords corresponding to a solution note and/or a knowledge base article ("KBA"), according to some implementations of the current subject matter.

FIG. 4 illustrates an exemplary user interface 400 displaying various generated keywords corresponding to a solution note/knowledge base articles (KBAs) and/or corresponding incidents, according to some implementations of the current subject matter. For example, a solution note "Different assigned values in availability control/reporting" may be configured to include one or more of the following recommended keywords: "PO number", "table EBAN", etc., as shown in FIG. 4. The view 400 may be configured to associate specific incidents (e.g., incident description column in view 400) with keyword recommendations to search for a specific solution note to address the incident.

Figure 5:
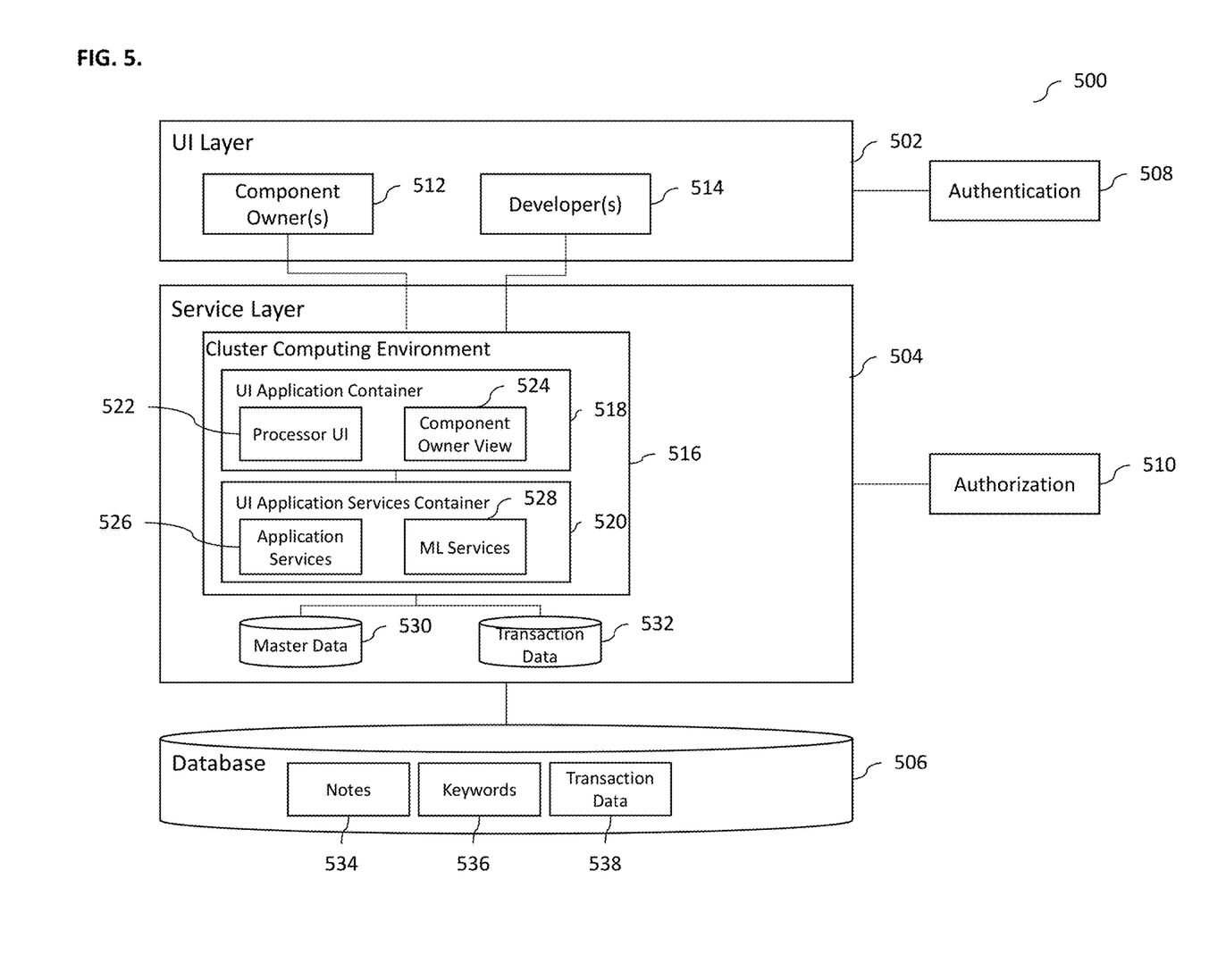
FIG. 5 illustrates an exemplary keyword generation/recommendation system architecture, according to some implementations of the current subject matter.

FIG. 5 illustrates an exemplary keyword generation/recommendation system 500, according to some implementations of the current subject matter. The system 500 may include one or more modules such as, for example, a user interface (UI) layer 502, a service layer 504, a database 506, an authentication computing service 508, and an authorization computing service 510. One or more modules of the system 500 may be provided as micro-services that may be hosted individually and/or jointly in one or more containers (e.g., Docker containers) and orchestrated by a cluster computing environment (e.g., Kubernetes platform-as-a-service (PaaS)). The micro-services may be used by one or more users (e.g., users 102 shown in FIG. 1), easily integrated in any computing systems, computing environment and/or UI independent. The system 500 modules (and/or services, components, processes, etc.) may be easily scaled, updated, replaced, and/or reused individually without affecting the other modules (and/or services, components, processes, etc.).

Referring back to FIG. 5, the UI layer 502 may include one or more component owner(s) user interfaces 512, one or more developer user interfaces 514, and/or any other user interfaces. An example of the component owner user interface is shown in FIGS. 3-4 and discussed above. Using user interfaces 512, component owners (which may be individual users, computing processes, software applications, etc.) may access specific computing components (e.g., software applications, computing systems, computing processes, etc.), view incident data, view keywords that may be recommended for a particular incident, search for specific solution notes to resolve issues in incidents, provide various data and/or feedback related to the incidents, keywords, solution notes, etc., as well as perform any other functions. The developers may use keywords that may be recommended to the developers prior to and/or post integration and/or during development of solution notes.

The service layer may include a cluster computing environment (e.g., Kubernetes) 516, a master data storage 530, and a transaction data storage 532. The cluster computing environment 516 may include one or more containers—a UI application container 518 and a UI application services container 520. The application container 518 may include a process UI view 522 and a component owner view 524. An exemplary processor view 522 is shown in FIG. 2. As stated above, the processor view 522 may include a listing of keywords for each solution note that may be associated with a particular incident (e.g., problem, issue, etc.) with a software application, computing component, process, etc. The processor view 522 may also include a listing of any actions that may be performed, e.g., request for keywords recommendation, keyword modification, keyword update, keyword deletion, etc. The view 522 may indicate a status of each particular solution note, keyword, action item, etc.

An exemplary component owner view 524 is shown in FIGS. 3-4 and discussed above. The view 524 may be used by one or more component owners (e.g., developers of components (e.g., software applications, processes, etc.), quality expert users of components, component user owners, manager users, auditor users, authorized users of components, and/or any other authorized users, etc.) to view details of solution notes, generated/recommended keywords, solution notes which may require keyword modification at component level, etc. for one or more components.

The UI application services container 520 may include application service(s) 526 and machine learning (ML) services 528. The services 526 and 528 may be configured to obtain various data related to incidents associated with execution of computing components (e.g., components 106 shown in FIG. 1). This data may include data (and/or metadata) identifying a specific component, data related to the nature of the incident (e.g., queries executed by the user, responses to queries, etc.) with that component, any existing keywords, solution notes, any search queries seeking solution, feedback entered by users of the computing component in response to solution notes (e.g., whether the solution note worked, did not work, etc.), and/or any other information.

In some implementations, the service(s) 528 may be configured to include various machine learning capabilities. For instance, the service(s) 528 may be configured to extract data that may be relevant to a computing component (e.g., entity name) associated with an incident, a particular incident (e.g., problem description), solution note, etc. and remove any text that may be unrelated or might not be used for generation of keywords. Moreover, the service(s) 528 may be configured to determine one or more frequencies of at least one of the following: occurrence of specific incidents (with/without respect to specific components), search queries looking for specific solution notes, keywords used in searches for solution notes, etc. Further, the service(s) may be configured to classify user responses (e.g., sentiments, etc.) in relation to particular solution notes, incidents, etc. Classification of user response may include an indication of whether a specific solution note resolved a particular incident or not, relevancy of recommended solution note to resolving an incident, etc. One or more of this data may be stored in one or more master data storage 530 and/or transaction data storage 532. The extracted data, frequency, classification, etc. may be used for the purposes of performing machine learning to determine one or more keywords (or updates thereof) that may be generated and/or recommended for inclusion in the solution notes either pre-integration and/or post-integration.

In some implementations, the ML services 528 may be configured to execute training of a keyword data model that may be used to generate one or more keywords for use in identifying one or more solution notes. For example, the data model may use one or more variables that may correspond to computing components 106, incidents, incident specifics, search queries, keywords, historical data (e.g., prior keywords, prior solution notes, prior search queries, prior computing components, etc.), user sentiment/feedback, and/or any other data. Each of the variables may be associated with a particular value (e.g., component variable may include an identifier value identifying a particular component, such as, component 1 106a, as shown in FIG. 1). The data that may be used by ML services 528 may be appropriately "cleaned" by extracting only relevant information related to the above variables (e.g., removal of text that is not related to the problem with the computing component).

The ML services 528 may use the keyword data model, as a function of the above variables, to determine one or more keywords for associating with a particular solution note. The model may then be trained using the received dataset. Once the model has been trained, it may be applied to the variables to generate one or more keywords.

In some exemplary implementations, the generated/recommended keywords may be ranked based on, for example, occurrence in incidents, solution notes, uses in search queries for solution notes, etc. Ranking of keywords may be used to determine most frequently used or "top" keywords that may be recommended first for use in searching/identifying a particular solution note. Such "top" keywords may be most relevant keywords in identifying the correct solution note for a specific incident associated with a particular computing component.

Further, the keywords may be mapped (and/or linked) to specific solution notes and/or incidents. In some exemplary implementation, a strength of the mapping between keywords and/or solution notes/incidents may also be indicated. For example, use of a top keyword may result in retrieval of a solution note that directly solves an issue generated by a computing component, while use of a other keywords may be helpful in retrieval of a different solution note to further understand the issue, but would not resolve it.

In some implementations, once the keywords are generated/recommended, the keywords may be stored in the database 506 in the keyword storage component 536 along with solution note storage component 534. The database 506 may also storage various transaction data 538 that may be associated with generation of keywords.

The authentication module/component 508 may be configured to control access to the system 500. For example, in order to use the system 500 (e.g., for keyword generation, search of keywords, etc.), a user may need to login, using the module 508 (e.g., a secure portal) to the UI layer 502. The user may be presented with a corresponding view on the user interface. For example, a developer user may only be able to see and/or access solution notes for which the developer may be responsible. A component owner may only be able to access component owner's assigned components, where additional authorization checks may be required. Such checks may be performed using authorization module/component 510.

Figure 6:
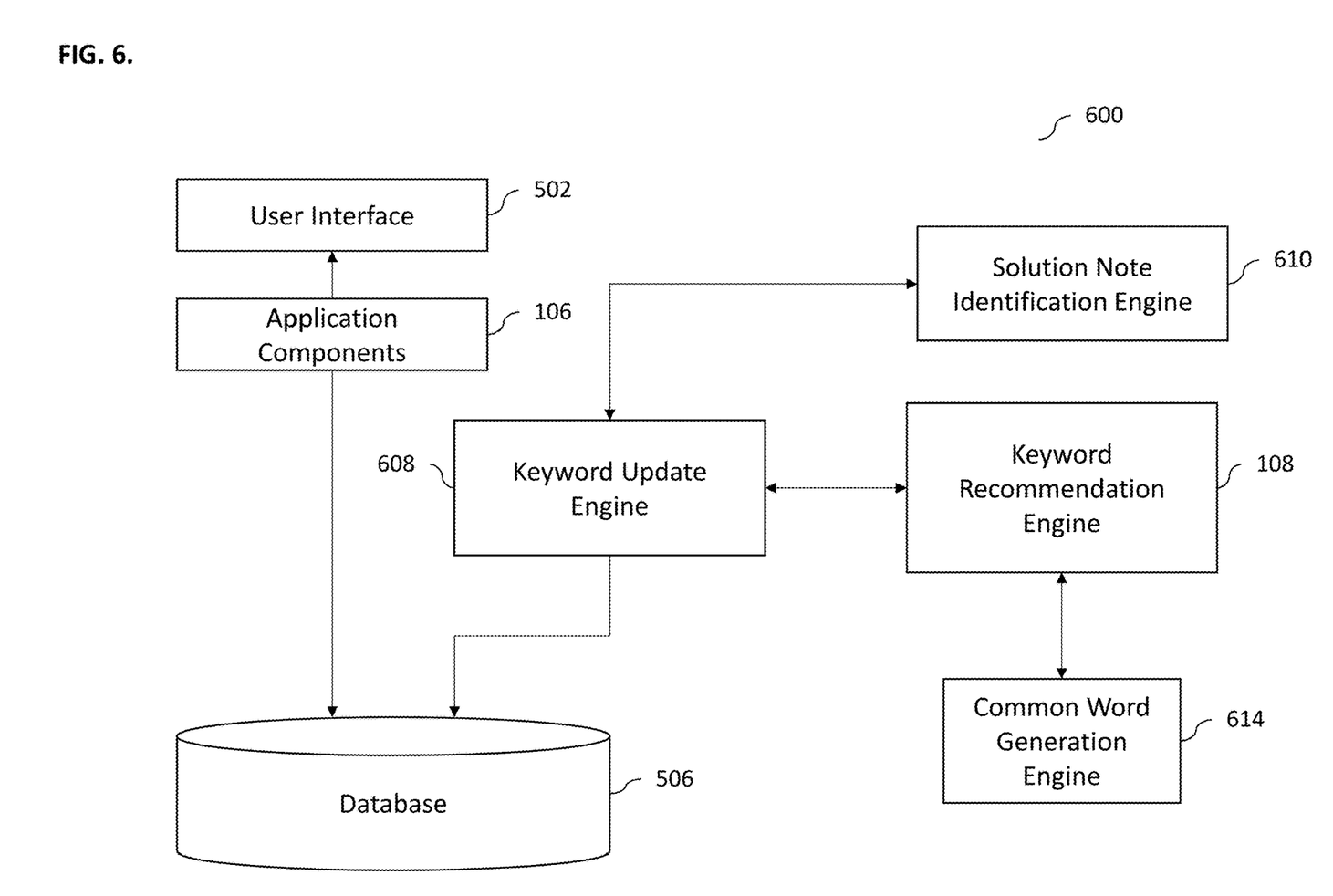
FIG. 6 illustrates an exemplary machine learning microservices system for generation/recommendation of keywords for searching of solution notes for resolving incidents associated computing components, according to some implementations of the current subject matter.

FIG. 6 illustrates an exemplary machine learning microservices system 600 for generation/recommendation of keywords for searching of solution notes for resolving incidents associated computing components, according to some implementations of the current subject matter. The microservices shown in FIG. 6 may, for example, be wrapped (e.g., as Docker images, etc.) and may be hosted in clustered computing environment (e.g., Kubernetes environment), e.g., environment 516 shown in FIG. 5.

In some implementations, the system 600 may include a user interface 502 (e.g., UI layer 502 as shown in FIG. 5), application components 106 (e.g., as shown in FIG. 1), a database 506 (e.g., as shown in FIG. 5), a keyword update engine 608, a solution note identification engine 610, a keyword recommendation engine 108 (as shown in FIG. 1), and a common word generation engine 614. The system 600 may include one or more additional micro-services. The micro-services may be configured to perform one or more of the following functions. The micro-services may fetch all solution notes, incident actionable count(s), relevant keywords, and/or aggregated top keywords for incidents associated with components 106. The micro-services may be configured to remove incident mapping for a particular solution note and incident. Using the micro-services, keyword(s) may be associated with and saved in connection with a particular solution note. This may also include saving one or more user actions of keyword acceptance, rejection and/or revalidation for a solution note. The micro-services may also fetch an overall count of solution notes for each component 106 based on a solution note status action. Moreover, the micro-services may fetch component and/or solution note status-based data, and/or trigger communications to processors with solution note, incident and/or top keywords details.

Referring to FIG. 6, the keyword recommendation engine 108 micro-service may be configured to generate and/or recommend one or more keywords for association/mapping/linking/etc. to a particular solution note, incident, component, solution note search query, and/or any combination thereof. The engine 108 may be communicatively coupled to the common word generation engine 614 that may be configured to generate/recommend one or more common words associated with a particular solution note, incident, component, solution note search query, and/or any combination thereof. Such common words may be provided to the keyword recommendation engine 108 for generation/recommendation of keywords. The solution note identification engine 610 micro-service may be configured to determine and provide identification of a particular solution note related to an incident. The keyword update engine 608 may be configured to update keywords (e.g., change, modify, delete, add, etc.) that have been previously generated the keyword recommendation engine 108. The update may be performed automatically, manually, periodically, and/or as desired. As stated above, the keywords, solution notes, etc. may be stored in the database 506.

Figure 7:
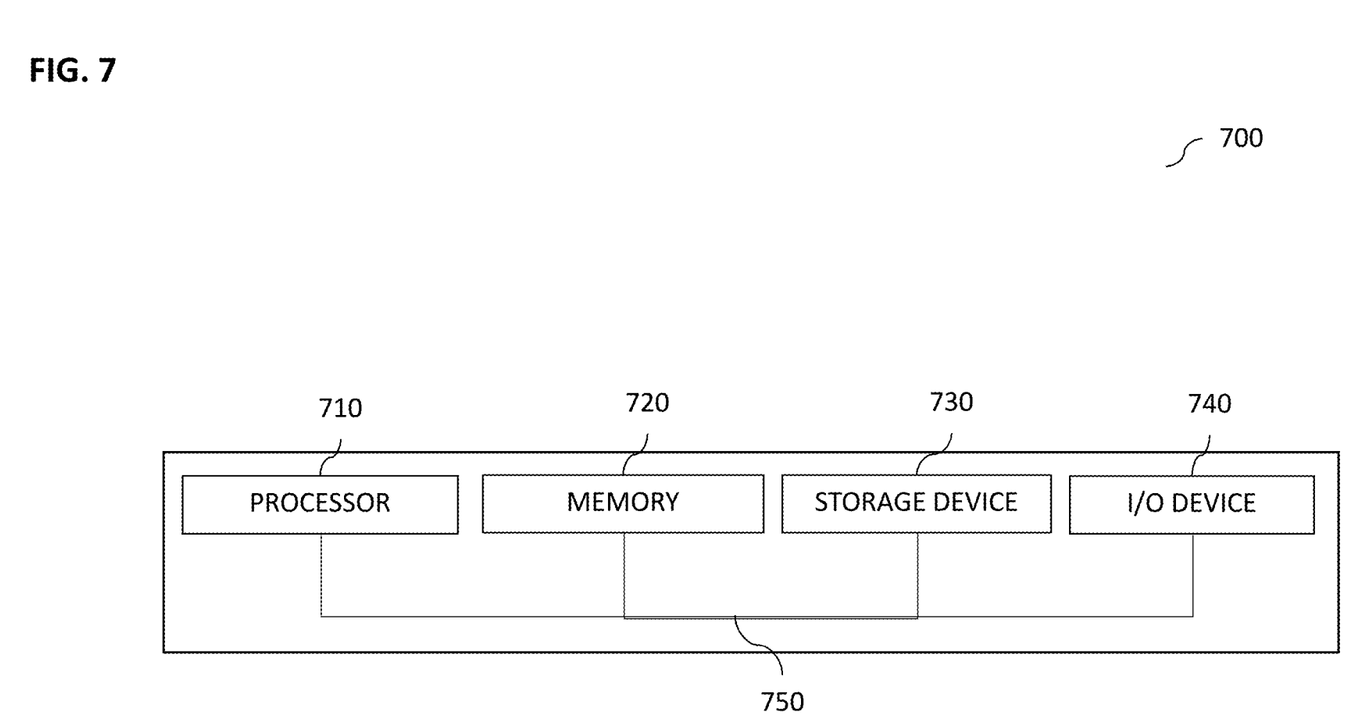
FIG. 7 illustrates an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
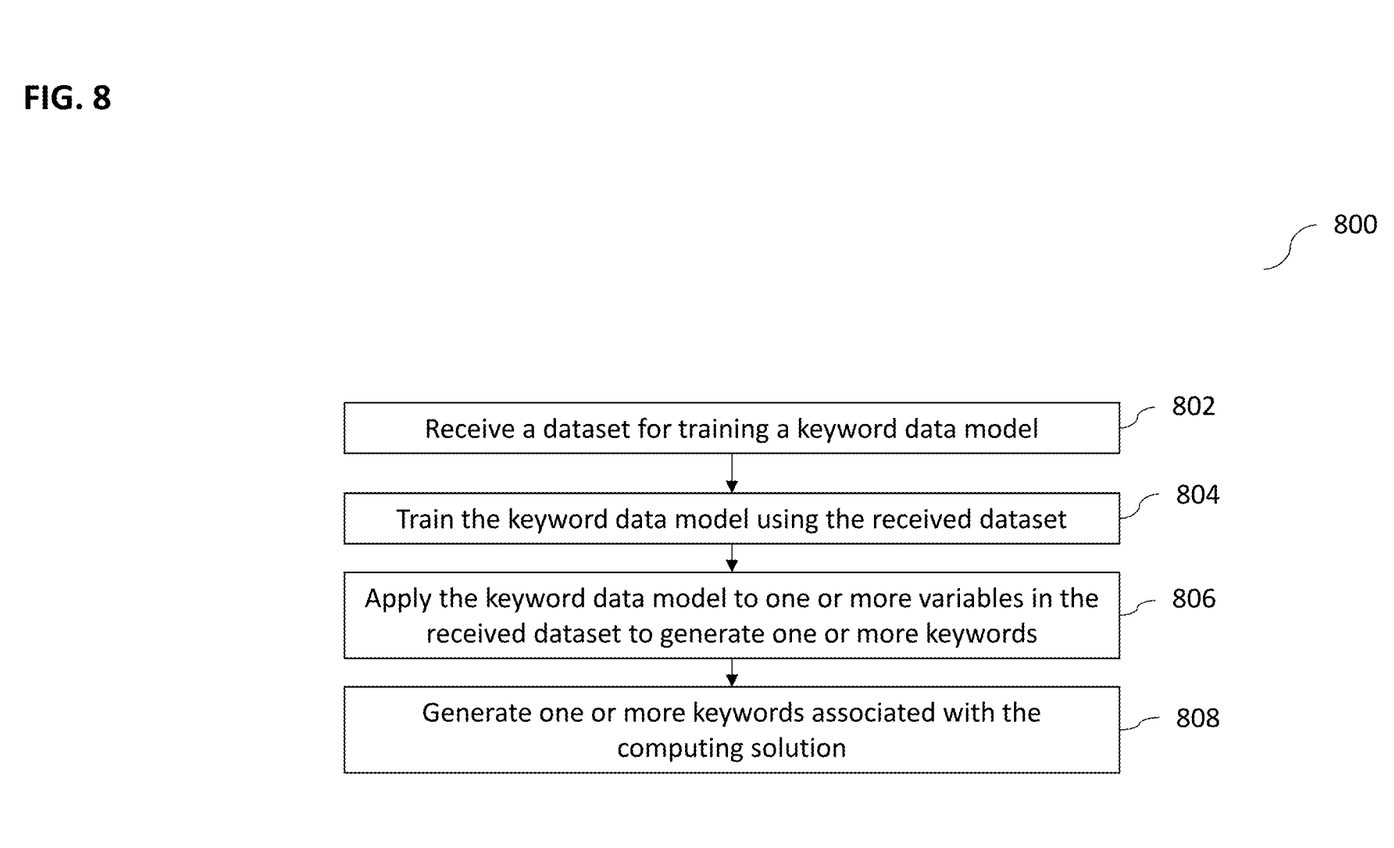
FIG. 8 illustrates an exemplary method, according to some implementations of the current subject matter.

FIG. 8 illustrates an exemplary method 800 for generation of keywords for a solution note for resolving an issue associated with a computing component, according to some implementations of the current subject matter. The method 800 may be executed by the system 100 (shown in FIG. 1), and in particular the systems 500-600, as shown in FIG. 5-6. The method 800 may implement the techniques discussed above in connection with FIGS. 1-6.

At 802, the system 100 (and/or systems 500/600) may be configured to receive a dataset for training a keyword data model. For example, engine 108 shown in FIG. 1 may be configured to receive data from one or more components (e.g., incident data 110, solution note data 112). The data may include data variables identifying components, incidents, incident specifics, search queries, keywords, historical data, and/or any other data. Each of the variables may be associated with one or more values (e.g., component variable may include an identifier associated with a particular component, such as component 1 106a, as shown in FIG. 1). The keyword data model may be configured for determination, as a function of one or more variables, of one or more keywords in a plurality of keywords. The keywords may be associated with a computing solution (e.g., solution note) in a plurality of computing solutions for resolving a problem (e.g., incident) with an operation of a computing component (e.g., computing component 106 as shown in FIG. 1) in a plurality of computing components;

At 804, the keyword recommender engine 108 may be configured to train the keyword data model using the received dataset. For example, the training may be performed using ML services component 528 shown in FIG. 5.

At 806, the keyword recommender engine 108 may be configured to apply the keyword data model to one or more variables (e.g., variables identifying components, incidents, incident specifics, search queries, keywords, historical data, and/or any other data) in the received dataset to generate one or more keywords (e.g., keywords shown in FIGS. 3-4 in the component owner view). At 808, the keyword recommender engine 108 may be configured to generate one or more keywords associated with the computing solution.

In some implementations, the current subject matter may include one or more of the following optional features. For example, the plurality of variables may include at least one of the following: variables identifying one or more computing components in the plurality of computing components, variables identifying one or more computing solutions in the plurality of computing solutions, variables identifying at least one keyword in the plurality of keywords, variables identifying one or more indications indicating applicability of the computing solution to resolving the problem, and any combination thereof. The generation of keywords may include ranking the one or more generated keywords using the variables in the plurality of variables. Further, the values associated with the variables may include one or more historical values (e.g., previously used keywords, previously used solution notes, etc.).

In some implementations, generation of keywords may include associating the generated keywords with the computing solution in the plurality of computing solutions prior to using the computing solution to resolving the problem. Alternatively, or in addition to generation of keywords may include associating the generated keywords with the computing solution after using the computing solution to resolving the problem.

In some implementations, the method 800 may also include updating the generated keywords by repeating at least one of the receiving, the training, the applying and the generating using an updated dataset. At least one of the receiving, the training, the applying and the generating may be performed using one or more computing containers being executed in a clustered computing environment.

In some implementations, the method may include generating one or more views for at least one of performing at least one of the receiving, the training, the applying and the generating, and displaying the generated keywords. The method may also include searching, using the generated keywords, for the computing solution for resolving the problem with the operation of the computing component in the plurality of computing components. The search may be executed using one or more views.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving, by at least one processor, a training dataset for training, using a machine learning engine, a machine learning model,
wherein the training dataset includes a plurality of variables associated with one or more values,
wherein the plurality of variables includes one or more first variables indicative of one or more problems, one or more second variables indicative of one or more computing solutions to the one or more problems, one or more third variables indicative of user feedback entered by a user of a computing component regarding whether a corresponding solution worked to resolve a corresponding problem, one or more fourth variables indicative of one or more computing components, and one or more fifth variables identifying one or more keywords used to search for corresponding computing solution to a corresponding problem,
wherein the machine learning model is configured for determination, as a function of one or more variables in the plurality of variables, of the one or more keywords in a plurality of keywords associated with a computing solution in a plurality of computing solutions for resolving a problem with an operation of the computing component in a plurality of computing components;
training, using the machine learning engine and by the at least one processor, the machine learning model using the received training dataset including the plurality of variables, wherein the plurality of variables comprises the one or more first variables, the one or more second variables, the one or more third variables, the one or more fourth variables, and the one or more fifth variables, wherein the machine learning model is trained, using the received training dataset, to enable generation of the one or more keywords;
applying, by the at least one processor, the trained machine learning model to one or more variables to generate the one or more keywords associated with the computing solution;
updating the one or more generated keywords by repeating the receiving, the training, the applying, and the generating using an updated training dataset;
searching, using the one or more generated keywords, for the computing solution for resolving the problem with the operation of the computing component in the plurality of computing components, wherein the searching is executed using one or more views; and
retrieving, by the searching using the one or more generated keywords, the computing solution that directly solves the problem generated by the computing component without additional steps.

2. The method according to claim 1, wherein the plurality of variables include variables identifying one or more indications indicating applicability of the computing solution to resolving the problem.

3. The method according to claim 1, wherein the generating includes ranking the one or more generated keywords using the one or more variables in the plurality of variables.

4. The method according to claim 1, wherein the one or more values associated with the one or more variables include one or more historical values.

5. The method according to claim 1, wherein the generating further comprises associating the one or more generated keywords with the computing solution in a plurality of computing solutions prior to using the computing solution to resolving the problem.

6. The method according to claim 1, wherein the generating further comprises associating the one or more generated keywords with the computing solution in a plurality of computing solutions after using the computing solution to resolving the problem.

7. The method according to claim 1, wherein at least one of the receiving, the training, the applying, and the generating are performed using one or more computing containers being executed in a clustered computing environment.

8. The method according to claim 1, further comprising generating the one or more views for at least one of performing at least one of the receiving, the training, the applying, and the generating, and displaying the one or more generated keywords.

9. A system comprising:
at least one processor; and
at least one non-transitory machine-readable medium storing instructions that, when executed by the at least one processor, cause the at least one processor to perform operations comprising:
receiving, by at least one processor, a training dataset for training, using a machine learning engine, a machine learning model,
wherein the training dataset includes a plurality of variables associated with one or more values,
wherein the plurality of variables includes one or more first variables indicative of one or more problems, one or more second variables indicative of one or more computing solutions to the one or more problems, one or more third variables indicative of user feedback entered by a user of a computing component regarding whether a corresponding solution worked to resolve a corresponding problem, one or more fourth variables indicative of one or more computing components, and one or more fifth variables identifying one or more keywords used to search for corresponding computing solution to a corresponding problem,
wherein the machine learning model is configured for determination, as a function of one or more variables in the plurality of variables, of the one or more keywords in a plurality of keywords associated with a computing solution in a plurality of computing solutions for resolving a problem with an operation of the computing component in a plurality of computing components;
training, using the machine learning engine and by the at least one processor, the machine learning model using the received training dataset including the plurality of variables, wherein the plurality of variables comprises the one or more first variables, the one or more second variables, the one or more third variables, the one or more fourth variables, and the one or more fifth variables, wherein the machine learning model is trained, using the received training dataset, to enable generation of the one or more keywords;

applying, by the at least one processor, the trained machine learning model to one or more variables to generate the one or more keywords associated with the computing solution;

updating the one or more generated keywords by repeating the receiving, the training, the applying, and the generating using an updated training dataset;

searching, using the one or more generated keywords, for the computing solution for resolving the problem with the operation of the computing component in the plurality of computing components, wherein the searching is executed using one or more views, and retrieving, by the searching using the one or more generated keywords, the computing solution that directly solves the problem generated by the computing component without additional steps.

10. The system according to claim 9, wherein the plurality of variables include variables identifying one or more indications indicating applicability of the computing solution to resolving the problem.

11. The system according to claim 9, wherein the generating includes ranking the one or more generated keywords using the one or more variables in the plurality of variables.

12. The system according to claim 9, wherein the one or more values associated with the one or more variables include one or more historical values.

13. The system according to claim 9, wherein the generating further comprises associating the one or more generated keywords with the computing solution in a plurality of computing solutions prior to using the computing solution to resolving the problem.

14. The system according to claim 9, wherein the generating further comprises associating the one or more generated keywords with the computing solution in a plurality of computing solutions after using the computing solution to resolving the problem.

15. The system according to claim 9, wherein at least one of the receiving, the training, the applying, and the generating are performed using one or more computing containers being executed in a clustered computing environment.

16. The system according to claim 9, wherein the operations further comprise generating the one or more views for at least one of performing at least one of the receiving, the training, the applying, and the generating, and displaying the one or more generated keywords.

17. A computer program product comprising a non-transitory machine-readable medium storing instructions that, when executed by at least one processor, cause the at least one processor to perform operations comprising:

receiving, by at least one processor, a training dataset for training, using a machine learning engine, a machine learning model, wherein the training dataset includes a plurality of variables associated with one or more values, wherein the plurality of variables includes one or more first variables indicative of one or more problems, one or more second variables indicative of one or more computing solutions to the one or more problems, one or more third variables indicative of user feedback entered by a user of a computing component regarding whether a corresponding solution worked to resolve a corresponding problem, one or more fourth variables indicative of one or more computing components, and one or more fifth variables identifying one or more keywords used to search for corresponding computing solution to a corresponding problem, wherein the machine learning model is configured for determination, as a function of one or more variables in the plurality of variables, of the one or more keywords in a plurality of keywords associated with a computing solution in a plurality of computing solutions for resolving a problem with an operation of the computing component in a plurality of computing components;

training, using the machine learning engine and by the at least one processor, the machine learning model using the received training dataset including the plurality of variables, wherein the plurality of variables comprises the one or more first variables, the one or more second variables, the one or more third variables, the one or more fourth variables, and the one or more fifth variables, wherein the machine learning model is trained, using the received training dataset, to enable generation of the one or more keywords;

applying, by the at least one processor, the trained machine learning model to one or more variables to generate the one or more keywords associated with the computing solution;

updating the one or more generated keywords by repeating the receiving, the training, the applying, and the generating using an updated training dataset;

searching, using the one or more generated keywords, for the computing solution for resolving the problem with the operation of the computing component in the plurality of computing components, wherein the searching is executed using one or more views; and retrieving, by the searching using the one or more generated keywords, the computing solution that directly solves the problem generated by the computing component without additional steps.

18. The method according to claim 1, further comprising ranking the one or more views.

* * * * *